Figure 1:
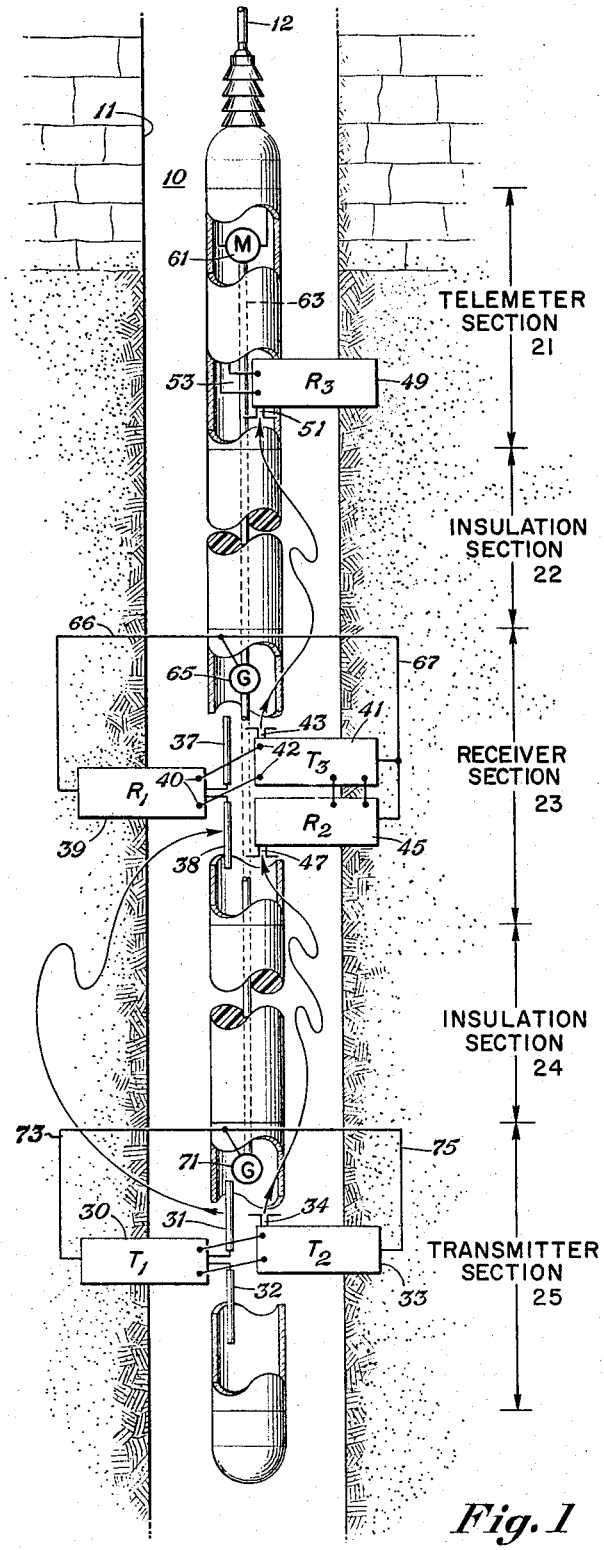

May 14, 1968     G. L. HOEHN, JR     3,383,586
POWER SUPPLY INCLUDING NON-CONDUCTIVE MECHANICAL TRANSMISSION
MEANS FOR RADIO FREQUENCY EXPLORATION UNIT
Filed Nov. 12, 1963

INVENTOR.
Gustave L. Hoehn, Jr.
BY Sidney A. Johnson
Attorney

United States Patent Office 3,383,586
Patented May 14, 1968

3,383,586
POWER SUPPLY INCLUDING NON-CONDUCTIVE MECHANICAL TRANSMISSION MEANS FOR RADIO FREQUENCY EXPLORATION UNIT
Gustave L. Hoehn, Jr., Dallas, Tex., assignor to Mobil Oil Corporation, a corporation of New York
Filed Nov. 12, 1963, Ser. No. 322,984
6 Claims. (Cl. 324—6)

This invention relates to electromagnetic exploration and more particularly to the provision of power for electrically-isolated radio frequency transmitter and receiver units. In a more specific aspect, the invention relates to the provision of a non-conductive mechanical transmission of energy to supply power to isolated transmitters and receivers. In a still further specific aspect, the invention relates to a radio frequency logging system having a radio frequency transmitter and receiver spaced apart one from another and electrically powered locally through the mechanical transmission of energy thereto.

Various systems are known in the prior art in which electromagnetic energy is employed for the measurement of physical constants of the earth. In accordance with a system to which the present invention applies, an R.F. transmitter and an R.F. receiver are housed in a well logging tool in spaced apart relation. R.F. energy transmitted from current electrodes excited by the transmitter is detected by potential electrodes connected to the receiver. Highly sensitive measurements are made as to phase and amplitude of the current and potential in order to evaluate physical constants of the formations surrounding a borehole into which the tool is lowered. The problem of isolation of such units, in order to assure transmission with the resolution desired, requires that there be no conductive linkage between the three units, the transmitter, the receiver and the telemetering unit. Thus, separate radio frequency links are employed between transmitter and receiver locations and between the receiver and telemetry locations. It has been found necessary to power the transmitter and the receiver units from storage cells and thus there has been introduced problems as to operating life as well as the housing of the storage cells.

In accordance with the present invention, there is provided a radio frequency probing system having an R.F. radiator spaced from a control station with an auxiliary communication link between the radiator and the control station, the link being of non-conductive character. Included is a prime mover at the control station adapted to be supplied with energy from a source remote from the station. A generator is coupled in energizing relation to the radiator. An insulating mechanical linkage extends from the prime mover to the generator to produce electrical power in the generator for use by the radiator without introducing a conductive linkage.

Figure 2:
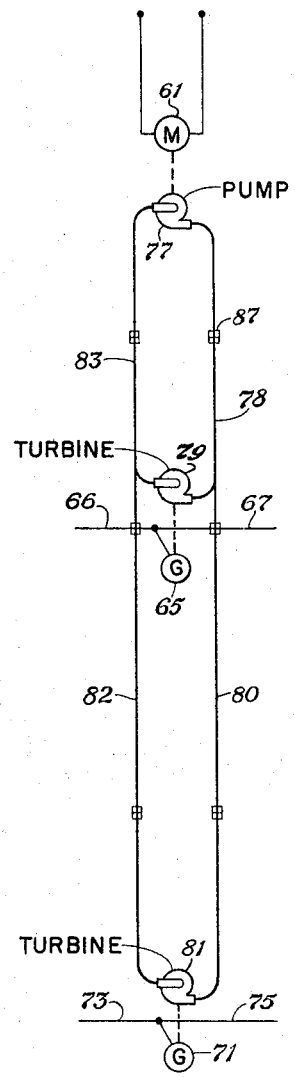

For a more complete understanding of the present invention and for further objects nad advantages thereof, reference may now be had to the following description taken in conjunction with the accompanying drawings in which:

FIGURE 1 is a shematic illustration partly in section showing one embodiment of the invention; and FIGURE 2 illustrates a modification of a portion of the system of FIGURE 1.

In FIGURE 1, an exploring tool 10 is adapted to be lowered into a borehole 11 by way of a cable 12. The exploring tool 10 is comprised of a telemeter section 21, an insulating section 22, a receiver section 23, an insulating section 24, and a transmitter section 25. The system is so constructed as to induce radio frequency current from the transmitter section into the surrounding earth formations. The resultant radio frequency potential appearing in the region of the receiver section 23 is sensed. The phase and amplitude of the transmitter current and of the receiver potential are then transmitted from the receiver section 23 to the telemeter section 21 where the functions thus provided are transmitted to the earth's surface and are recorded as a function of the location at the depth of the unit 10.

In the embodiment illustrated in FIGURE 1, a two channel unit or section includes a radio frequency transmitter 30 which serves to drive a dipole comprised of elements 31 nd 32. The transmitter 30 is operated at a preset level both as to frequency and to amplitude. A data signal, a signal regarding the probe signal from the transmitter 30, is coupled to a second transmitter 33. Transmitter 33 then drives a telemeter dipole 34 for transmission of a signal up along the unit 10 indicative of phase and amplitude of the probe current induced in the earth formations by excitation of dipole 31, 32. In practice, the elements 31 and 32 may be of the same diameter as the housing 10 as to form integral parts of the walls of the housing 10. However, for the purpose of illustration, the diagrammatic representation has been employed in FIGURE 1. Normally, the transmitter 30 would be housed within the dipole elements 31 and 32. The transmitter 33 likewise would be housed within the dipole elements 31 and 32 with the dipole 34 adapted for transmission up along unit 10.

The transmitter section 25 is isolated from the receiver section 23 by an insulating section 24. It has been found that it is necessary to eliminate all electrical conductive connections between the transmitter section 25 and the receiver section 23. In the receiver section 23, receiving electrodes 37 and 38 form a receiving dipole which provides an input signal to a receiver 39. The electrodes 37 and 38 detect the R.F. signal from the transmitting dipole 31, 32 and apply a potential to the receiver 39 which is representative of the detected potential. The output terminals 40 of receiver 39 are connected to the input terminals 42 of a transmitter 41. Transmitter 41 drives a telemetering dipole 43.

A second receiver 45 is located in the receiver section 23 and is excited from a detecting dipole 47. Receiver 45 is tuned to the frequency of transmitter 33 while receiver 39 is tuned to a different frequency, namely the frequency of transmitter 30. The receiver 45 is connected to the transmitter 41 so that transmitter 41 may transmit to the portions of the instrument positioned in the upper portion of unit 10 information functions representative of phase and amplitude of the transmitted current as well as the phase and amplitude of received potential. Thus, the unit 23 serves as a multi-channel transceiver.

Located in telemeter section 21 is a third receiver 49. Receiver 49 is fed at its input by a receiving dipole 51 and is tuned to the same frequency as the transmitter 41. Thus, there is produced on the output channel 53 of the receiver 49 electrical functions indicative of the phase and amplitude of both the transmitted current and the received potentials. The output channel 53 extends to the earth's surface by way of cable 12 in order to permit evaluation of physical constants of the earth at the location of the unit 10.

In accordance with the present invention, the logging system is provided with a motor 61 which is excited by electrical energy from the earth's surface delivered through cable 12. The motor 61 is coupled by way of a mechanical linkage 63 which extends through the telemeter section 21, the insulating section 22, the receiver section 23, the insulating section 24, and into the transmitter section 25. The link 63 is coupled to an alternating current generator 65 in the receiver section 23. Generator 65 is coupled by way of a power channel 66 to the receiver 39 and by way of channel 67 to the receiver 45 and the transmitter 41. Similarly, in the transmitter section, the linkage 63 drives a second generator 71 which is connected by way of a power channel 73 to supply the transmitter 30 and, by way of channel 75, to supply the transmitter 33 with power.

The linkage 63 in the preferred form of the invention is non-conductive but is capable of the transmission of mechanical energy from the motor 61 to the generators 65 and 71. In one form, the linkage 63 is an elongated, cylindrical shaft provided with suitable couplings at each of the junctions between the sections 21–25. The shaft is of insulating material such as fiberglass or other known radio frequency insulating material capable of transmitting torque.

In accordance with another embodiment of the invention, the link 63 may comprise a hydraulic system in which the generators 65 and 71 are turbine-driven devices and the motor 61 drives a pump. The latter system is illustrated in FIGURE 2. In this embodiment, the motor 61 drives a pump 77. The pump 77 is coupled by way of line 78 to a first turbine 79 which is located in the receiver section 23. It is also coupled by way of line 80 to a second turbine 81 located in the transmitter section 25. Turbine 79 drives the generator 65 and turbine 81 drives the generator 71. Return flow lines 82 and 83 extend back to the pump 77. Generator 65 then supplies power to the busses 66 and 67. The generator 71 supplies power to the busses 73 and 75. The lines 78, 80, 82, and 83 are provided with disconnect couplings such as the couplings 87 which permit the hydraulic lines to be made up in assembling the system. In operation, the transmitter 30 is actuated at frequencies in the range from about two (2) to one hundred (100) kilocycles. The transmitter 45 operates at ultra-high frequencies of the order of thirty (30) megacycles. By this means, there may be maintained separation between the earth signals and the telemetry signals. The tool 10 may be of the order of thirty (30) feet in length with the insulating section 24 being of the order of fifteen (15) feet in length. The transmitter and receiver dipoles are short compared with the half wave lengths at the frequency employed. With a system of this type, resistivity of the order of $10^6$ ohmmeters has been measured in open air. Resistivities in a borehole in a salt dome of the order of $10^4$ to $10^5$ ohmmeters have been measured. However, because of the use of batteries in the prior art systems, measurements have been limited to short intervals which have been found highly undesirable. The present invention provides for the transmission of power from a comparatively unlimited source to both the transmitter and receiver sections while maintaining the electrical isolation found to be necessary.

The system illustrated in FIGURE 1 is a diagrammatic form. The telemetering dipoles 34, 43, 47 and 51 have been illustrated in the form of electric dipoles. In practice, the telemetering links preferably will employ an inductive coupling between ferrite rods within coils whose axes are parallel with the axis of the exploring unit 10, forming "magnetic dipoles" rather than electric dipoles illustrated in FIGURE 1.

The system including current electrodes 31 and 32 and receiving electrodes 37 and 38 has been described. It is generally recognized in electrical measurements of earth properties that the use of both a transmitting and a receiving system is preferable in order to eliminate from the measurement variations in contact resistance. In those instances where it is possible to measure the loading on the transmitter and the phase angle of the impedance into which the transmitter operates, the receiving portion of the sysem, as shown in FIGURE 1, may be eliminated.

In accordance with one embodiment of the invention, an R.F. probe is employed having an R.F. radiator spaced from a control station. A communication link between the probe and the control station is non-conductive. A prime mover at the control station is supplied with energy from a remote point. A generator is coupled to the radiator in energizing relation. An insulating mechanical transmission linkage extends from the prime mover to the generator for production of electrical power by the generator for use by the radiator. Logging of earth formations is thus carried out in a borehole by radio frequency waves generated in an exploring unit. The method involves mechanically supporting in the unit in electrical isolation, a radio frequency wave source. Mechanical energy is delivered to the source while maintaining such isolation. The mechanical energy is then converted to electrical energy which is then applied to the source for energization thereof.

Having described the present invention in connection with certain specific embodiments thereof, it is to be understood that further modifications may now suggest themselves to those skilled in the art and it is intended to cover such modifications as fall within the scope of the appended claims.

What is claimed is:

1. A well logging unit having an elongated housing adapted for movement through a well bore which comprises:
  (a) an R.F. transmitter at the lower end of said housing,
  (b) an R.F. receiver in the upper portion of said housing intermediate the length of said housing,
  (c) telemetering means including a prime mover,
  (d) a pair of insulating units separating said receiver from said telemetering unit and said receiver from said transmitter, respectively,
  (e) electric generators in both said transmitter and said receiver,
  (f) a non-conductive mechanical transmission linkage extending from said prime mover to both said generators, and
  (g) means for applying power to said prime mover for energizing said transmitter and said receiver by way of said generators.

2. The combination set forth in claim 1 in which said linkage is an insulating drive shaft extending from said prime mover to said transmitter and mechanically coupled in driving relation to both said generators.

3. The combination set forth in claim 1 in which said linkage is a hydraulic powered system having flow lines extending to and from said generators.

4. A well logging unit having an elongated housing adapted for travel through a well bore which comprises:
  (a) an R.F. transmitter in the lower region of said housing,
  (b) R.F. receiver at an intermediate point in said housing,
  (c) a telemetering unit including a prime mover in the upper region of said housing,
  (d) a cylindrical electrode forming part of said housing for said transmitter and a second cylindrical electrode forming part of said housing for said receiver,
  (e) a pair of insulating units forming parts of said housing separating said receiver and its electrode from said telemetering unit and from said transmitter and its electrode, respectively,
  (f) electric generators within both said electrodes,
  (g) a non-conductive mechanical transmission linkage extending from said prime mover through said insulating units and at least one of said electrodes and coupled to both said generators, and
  (h) means for applying power to said prime mover for energization of both said transmitter and said receiver from said generators.

5. In a well logging unit having an elongated housing adapted to travel through a well bore, the combination which comprises:
  (a) a two channel R.F. transmitter in the lower region of said housing for applying a probe signal to formations adjacent to said well and for telemetering a data signal regarding said probe signal along said unit, (b) R.F. transciever means in the intermediate region of said housing for receiving said probe signal and for receiving said data signal and for transmitting the same along said unit, (c) a telemetering unit in the upper region of said housing responsive to the output of said transciever and including a prime mover, (d) a pair of electrically insulating units separating said transciever from said telemetering unit and from said transmitter, respectively, (e) electric generators, one for each of said transmitter and transceiver, (f) a mechanical transmission linkage which is electrically non-conductive and which extends from said prime mover through said insulating units and is coupled to both said generators, and (g) means for applying power to said prime mover for energization of both said transmitter and said receiver from said generators for production and delivery of said probe signal and said data signal to said telemetering unit.

6. In a well logging unit forming an elongated structure adapted to travel through a well bore, the combination which comprises:

(a) an R.F. transmitter having two radiators in the lower region of said structure and adapted to transmit signals at first and second frequencies, respectively, with at least one of said radiators adapted to apply an R.F. probe signal to formations adjacent to said well, (b) an R.F. transceiver in an intermediate region of the said structure having two receiving channels operative at said first frequency and second frequency, respectively, for sensing signals from said transmitter at both frequencies, (c) a telemetering unit in the upper region of said structure including a prime mover, (d) a first cylindrical electrode means housing said transmitter and a second cylindrical electrode means housing said transceiver, (e) a pair of insulating units separating said transceiver and its housing electrode means from said telemetering unit and from said transmitter and its housing electrode means, respectively, (f) an electric generator housed in at least one of said electrode means, (g) a non-conductive energy transmitting linkage extending generally parallel to the length of said structure from said prime mover through at least one of said insulating units and coupled in driving relation to said generator, and (h) means for energizing at least one of said transmitter and said receiver with energy applied from said prime mover to said generator.

References Cited

UNITED STATES PATENTS

| | | | |
|---|---|---|---|
| 2,139,460 | 12/1938 | Potapenko | 324—6 X |
| 2,524,031 | 10/1950 | Arps | 340—18 X |
| 2,659,046 | 11/1953 | Arps | 324—10 X |
| 3,286,163 | 11/1966 | Holser et al. | 324—6 |
| 2,978,634 | 4/1961 | Arps | 324—1 |
| 3,163,816 | 12/1964 | Clements et al. | 324—1 |
| 3,305,825 | 2/1967 | Godbey | 324—1 X |

RUDOLPH V. ROLINEC, Primary Examiner.

WALTER L. CARLSON, Examiner.

G. R. STRECKER, Assistant Examiner.